(12) United States Patent
Stuttard (10) Patent No.: US 6,697,066 B2
(45) Date of Patent: Feb. 24, 2004

(54) GRAPHICS SYSTEM

(75) Inventor: Dave Stuttard, Bristol (GB)

(73) Assignee: Clearspeed Technology Limited, Bristol (GB)

( * ) Notice: Subject to any disclaimer, the term of this patent is extended or adjusted under 35 U.S.C. 154(b) by 229 days.

(21) Appl. No.: 09/964,352

(22) Filed: Sep. 28, 2001

(65) Prior Publication Data

US 2002/0130866 A1 Sep. 19, 2002

(30) Foreign Application Priority Data

Sep. 29, 2000 (GB) .............................. 0023962

(51) Int. Cl.$^7$ ............................... G06T 15/60
(52) U.S. Cl. ...................... 345/426; 345/423
(58) Field of Search ................ 345/426, 423, 345/424, 427

(56) References Cited

U.S. PATENT DOCUMENTS 5,739,820 A    4/1998  Lyon

FOREIGN PATENT DOCUMENTS

WO    WO95/06298    3/1995

OTHER PUBLICATIONS

Heidrich et al.: INSPEC Abstract Accession No. 6886618 "Illuminating micro geometry based on precomputed visibility", (Jul. 23–28, 2000).

Heidrich et al.: INSPEC Abstract Accession No. 6120215 "Sampling procedural shaders using affine arithmetic" (Jul. 1998).

Cabral, Brian et al.: "Reflection Space Image Based Rendering", SIGGRAPH 99, Conference Proceedings, pp. 165–170.

Heidrich, Wolfgang et al.: "Realistic, Hardware–accelerated Shading and Lighting", SIGGRAPH 99, Conference Proceedings, pp. 171–178.

*Primary Examiner*—Mark Zimmerman
*Assistant Examiner*—Kimbinh T. Nguyen
(74) *Attorney, Agent, or Firm*—Burns, Doane, Swecker & Mathis, L.L.P.

(57) ABSTRACT

Shading values in a graphics processing system are determined by using approximation techniques. For example, where a Beckmann Distribution Function (BDF) is used, the shading values are determined by reformulating the BDF in terms of the scalar product of the surface normal and the viewpoint-light half-vector to produce a modified BDF. A portion of the BDF is divided into a plurality of intervals, each defined by first and second control points at its boundaries. Each interval is then approximated using a cubic approximation to produce coefficients for use in determining the shading values. In alternative embodiments, other functions are approximated.

43 Claims, 4 Drawing Sheets

GRAPHICS SYSTEM

The invention relates to data processing in a graphics system, and in particular, to real-time physically-based shading on SIMD (Single Instruction Multiple Data) architectures.

BACKGROUND OF THE INVENTION

With the advent of 3D graphics processors capable of per-pixel shading effects, focus has been shifting towards providing more advanced rendering techniques.

In recent years, much emphasis has been placed upon improving the speed of 3D graphics hardware. The focus has been to increase the number of polygons, the number of texels and so on. More recently, a trend has emerged to attempt to improve the quality of interactive 3D graphics, for example, by improving rendering techniques.

Traditionally, photo-realistic rendering has been the preserve of off-line rendering systems. However, more recently, these techniques have started to be used in contemporary interactive systems. Many of these techniques use the power of the texturing hardware to provide the desired functionality. For example, Cabral, et al., "Reflection Space Image Based Rendering, SIGGRAPH 99, conference proceedings, pages 165–170, and Heidrich et al., "Realistic, Hardware-accelerated Shading and Lighting, SIGGRAPH 99, Conference proceedings, pages 171–178, both demonstrate how effective this can be. The Cabral technique implements Bidirectional Reflection Distribution Functions (BRDF) using environment mapping hardware. Heidrich, on the other hand, uses multipass methods supported by current hardware to implement physically-based reflection models.

One example of a well known reflection model of a surface is the Phong model.

Another example of a well known physically-based reflection model is the Cook-Torrance model. This model is based on a previous model, known as the Torrance-Sparrow model, which describes a method that accounts for directional distribution of reflected light from roughened surfaces, simulated using microfacets.

Microfacets are assumed to be an isotropic collection of planar microscopic facets, each defined as a perfectly smooth reflector.

For the Cook-Torrance model, the specular component of bi-directional reflectivity is expressed as:

$$\rho_s = \frac{F_\lambda}{\pi} \frac{DG}{(\overline{N} \cdot \overline{V})(\overline{N} \cdot \overline{L})}$$

where, $F_\lambda$=Fresnel term, relating incident light to reflected light
$D$=Distribution function for microfacets
$G$=Geometrical attenuation factor, the masking and shadowing effects of the microfacets on each other.
$\overline{N}$=Surface normal
$\overline{V}$=Viewpoint vector
$\overline{L}$=Light vector In the above model, several known functions can be used to provide the microfacet distribution function, D. These include a Gaussian distribution; a Trowbridge-Reitz distribution and a Beckmann distribution. The Beckmann distribution is considered to be particularly advantageous because it provides the absolute magnitude of the reflectance without introducing arbitrary constants.

The Beckmann distribution function for rough surfaces is given as:

$$D = \frac{1}{4m^2 \cos^4 \beta} e^{-\left(\frac{\tan\beta}{m}\right)^2}$$

where, $m$=Root mean square slope of microfacets
$\beta$=Angle between $\overline{N}$ and $\overline{H}$, where $\overline{H}$ is the half vector between $\overline{V}$ and $\overline{L}$.

The value of "m" is basically an indication of the smoothness or roughness of a surface. It ranges between 0 and 1, with smooth surfaces having low values of m, and rough surfaces having high values of m.

The Beckmann distribution function suffers from the disadvantage that it is not particularly suited for real-time implementation, since it is relatively expensive to compute, and it must be computed for each pixel that is being considered for shading. In particular, the cosine and tan functions require a relatively large number of instruction cycles to compute. This means that the Beckmann distribution function is not particularly suited for use on a SIMD architecture.

The computation power required to compute the Cook-Torrance reflectance model is further hampered by the Fresnel term, F, which is also expensive in terms of the number of instruction cycles required to calculate the term.

The Fresnel equation relates incident light to reflected light for the smooth surface of each microfacet. The Fresnel equation can be expressed as:

$$F_\lambda = \frac{1}{2} \frac{(g-c)^2}{(g+c)^2} \left( 1 + \frac{(c(g+c)-1)^2}{(c(g-c)+1)^2} \right)$$

where, $c = \cos \theta_i \overline{L} \cdot \overline{H}$ $g^2 = \eta_\lambda^2 + c^2 - 1$ $\eta_\lambda = \frac{\eta_t \lambda}{\eta_i \lambda}$ where, $\eta_t \lambda$ and $\eta_i \lambda$ are the indices of refraction of the two media.

As with the Beckmann distribution function mentioned above, the Fresnel term is also unsuited for real time calculations.

Thus, although known methods exist for offering improved shading techniques, they are not particularly suited for real-time calculations, or for use on a conventional SIMD architecture.

Therefore, the aim of the present invention is to provide an approximation technique, which can be used to provide a physically-based shading technique that requires less computation than known techniques, and which is suited for use on a SIMD architecture.

SUMMARY OF THE INVENTION

According to a first aspect of the present invention, there is provided method of determining shading values in a graphics processing system using an approximation of a Beckmann Distribution Function (BDF), the BDF being defined as:

$$D = \frac{1}{4m^2\cos^4\beta} e^{-\left(\frac{\tan\beta}{m}\right)^2}$$

where, m=Root mean square slope of microfacets

β=Angle between $\overline{N}$ and $\overline{H}$ the method comprising the steps of:

(a) reformulating the BDF in terms of the scalar product of the surface normal $\overline{N}$ and the viewpoint-light half-vector $\overline{H}$ ($\overline{N}\cdot\overline{H}$) to produce a modified BDF;

(b) dividing a portion of the BDF into a plurality of intervals, n, each interval defined by first and second control points at its boundaries; and, (c) approximating each interval using a cubic approximation to produce coefficients for use in determining the shading values.

According to another aspect of the present invention, there is provided a method of determining shading values in a graphics processing system using a Cook-Torrance model, the Cook Torrance model being:

$$\rho_s = \frac{F_\lambda}{\pi} \frac{DG}{(\overline{N}\cdot\overline{V})(\overline{N}\cdot\overline{L})}$$

where, $F_\lambda$=Fresnel term, relating incident light to reflected light

D=Distribution function for microfacets

G=Geometrical attenuation factor, the masking and shadowing effects of the microfacets on each other.

$\overline{N}$=Surface normal $\overline{V}$=Viewpoint vector $\overline{L}$=Light vector the method comprising the steps of:

receiving data for a material being modelled;

approximating the microfacet distribution function D using a piecewise cubic interpolation of the distribution function; and, calculating the Cook-Torrance model using the approximation of the microfacet distribution function.

According to another aspect of the present invention, there is provided a method of determining shading values in a graphics processing system using an approximation of a microfacet distribution function, the method comprising the steps of:

(a) dividing a portion of the microfacet distribution function into one or more intervals, n, each interval defined by first and second control points at its boundaries; and, (b) approximating each interval using a polynomial approximation to produce coefficients for use in determining the shading values.

According to another aspect of the invention, there is provided a graphics processing system having means for determining shading values using an approximation of a Beckmann Distribution Function (BDF), the BDF being defined as:

$$D = \frac{1}{4m^2\cos^4\beta} e^{-\left(\frac{\tan\beta}{m}\right)^2}$$

where, m=Root mean square slope of microfacets

β=Angle between $\overline{N}$ and $\overline{H}$ the graphics processing system comprising:

(a) reformulating means for reformulating the BDF in terms of the scalar product of the surface normal and the viewpoint-light half-vector ($\overline{N}\cdot\overline{H}$) to produce a modified BDF;

(b) dividing means for dividing a portion of the BDF into a plurality of intervals, n, each interval defined by first and second control points at its boundaries; and, (c) approximating means for approximating each interval using a cubic approximation to produce coefficients for use in determining the shading values.

According to another aspect of the invention, there is provided a graphics processing system for determining shading values using a Cook-Torrance model, the Cook Torrance model being:

$$\rho_s = \frac{F_\lambda}{\pi} \frac{DG}{(\overline{N}\cdot\overline{V})(\overline{N}\cdot\overline{L})}$$

where, $F_\lambda$=Fresnel term, relating incident light to reflected light

D=Distribution function for microfacets

G=Geometrical attenuation factor, the masking and shadowing effects of the microfacets on each other.

$\overline{N}$=Surface normal $\overline{V}$=Viewpoint vector $\overline{L}$=Light vector the graphics processing system comprising:

receiving means for receiving data for a material being modelled;

approximating means for approximating the microfacet distribution function D using piecewise cubic interpolation of the distribution function; and, calculating means for calculating the Cook-Torrance model using the approximation of the microfacet distribution function.

According to another aspect of the present invention, there is provided a graphics processing system having means for determining shading values using an approximation of a microfacet distribution function, the graphics processing system comprising:

(a) dividing means for dividing a portion of the microfacet distribution function into one or more intervals, n, each interval defined by first and second control points at its boundaries; and, (b) approximating means for approximating each interval using a polynomial approximation to produce coefficients for use in determining the shading values.

BRIEF DESCRIPTION OF THE DRAWINGS

For a better understanding of the present invention reference will now be made, by way of example, to the accompanying drawings, in which.

DETAILED DESCRIPTION OF A PREFERRED EMBODIMENT OF THE INVENTION

The approximation techniques of the present invention will be described in relation to a SIMD based graphics hardware that can render scenes using physically-based reflection models. This is made possible by the ability of these systems to provide per-pixel calculation during the rendering process. However, it is noted that the approximation techniques are not limited for use of a SIMD architecture, but can be used in any architecture where the processing speed needs to be increased.

Figure 1:
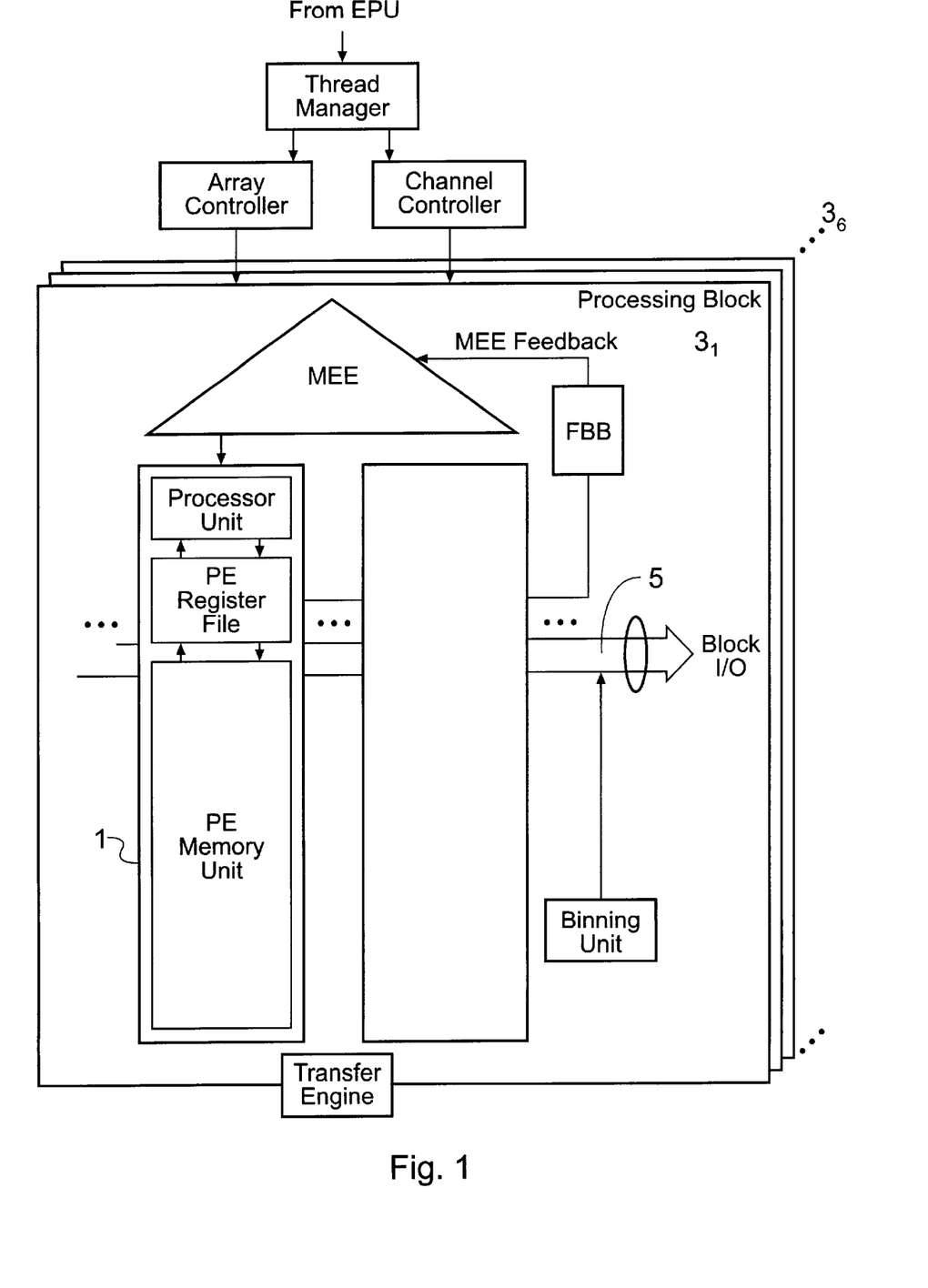
FIG. 1 shows a typical SIMD architecture.

FIG. 1 shows a typical SIMD architecture, comprising a large array of general purpose ALU's, 1, connected using 1-D topology. The ALUs 1 are relatively simple, being 8-bit ALUs, for example, with limited floating point support. A similar architecture is described in the applicant's earlier PCT patent application no. PCT/GB00/01332.

Preferably, the SIMD architecture uses an OpenGL driver for medium to high level workstations that is used as the basis for adding Cook-Torrance shading as an extension. The processors 1 are preferably fully programmable, with 1536 8-bit processors arranged in 6 blocks of 256, $3_1$ to $3_6$. Preferably, a high bandwidth communication bus 5 exists to access the shared memory for the SIMD array.

The SIMD array has a graphics pipeline, provided by a software application, which is used for generating the graphics images. The lighting and shading are performed per pixel, resulting in unique surface normals, view vectors and light vectors.

Figure 2:
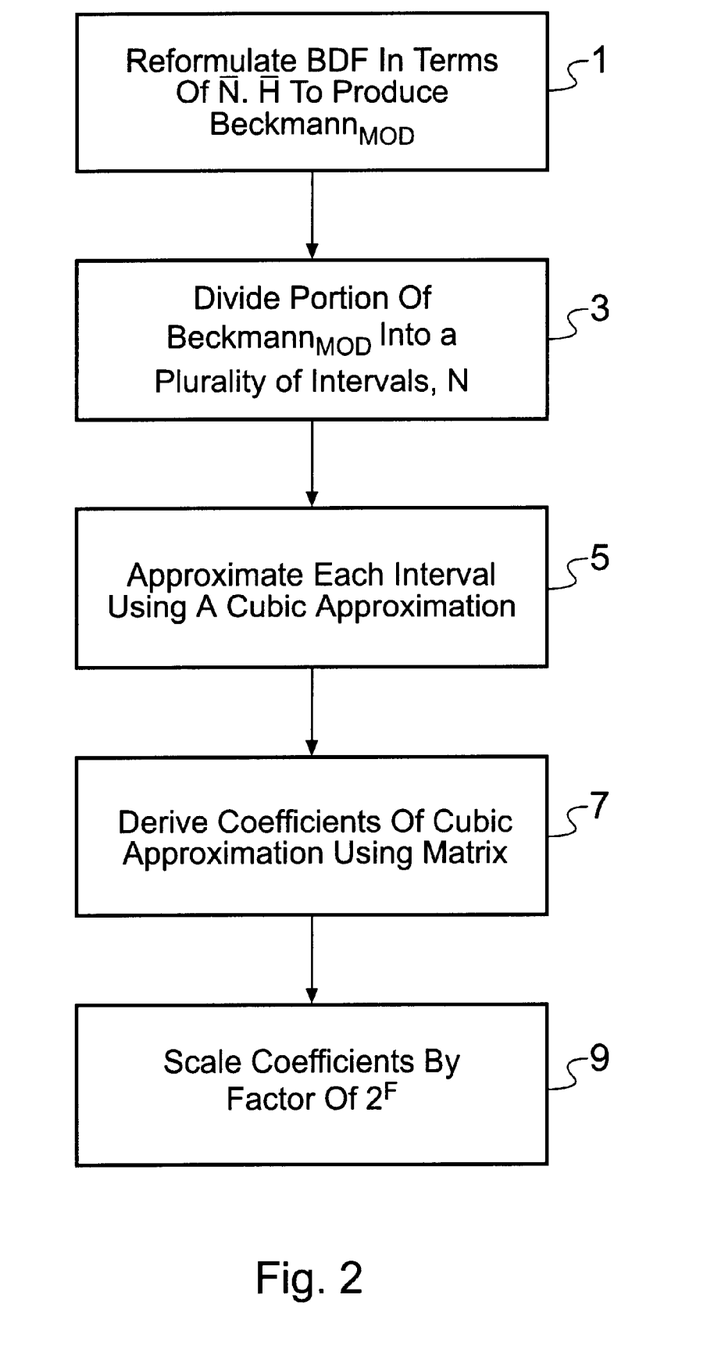
FIG. 2 shows the steps involved in approximating a distribution function, such as the Beckmann distribution function, according to a first aspect of the present invention.

FIG. 2 shows the steps involved in approximating a distribution function, such as the Beckmann distribution function, for use in such a SIMD architecture. It is noted that the technique is suitable for use with other distribution functions, such as Gaussian distribution and Trowbridge-Reitz distribution.

In order to reduce the amount of computation that is required each time the Beckmann distribution function is evaluated, the scalar product $\overline{N} \cdot \overline{H}$ is first calculated.

$\overline{N}$ and $\overline{H}$ are unit direction vectors which can be represented by $\cos \beta$. (H being a halfway vector between $\overline{V}$ and $\overline{L}$).

The BDF is first reformulated in terms of $\overline{N} \cdot \overline{H}$, step 1. This reformulated Beckmann Distribution Function will hereinafter be referred to a Beckmann$_{mod}$, which is expressed as:

$$D = \frac{1}{4m^2(\overline{N} \cdot \overline{H})^4} e^{\left(\frac{\tan\arccos\beta}{m}\right)^2}$$

A portion of the Beckmann$_{mod}$ curve is then divided into a plurality of intervals, n, as shown in step 3. Preferably, the portion of the curve relates to the most significant portion, i.e., the portion having the greatest change. The significant portion of the curve may be determined, for example, by detecting the portion of the curve where the value is non-zero. However, the portion of the curve could equally relate to the entire width of the curve.

Each of the n intervals will have endpoints, which are defined as the control points of that particular interval of the curve. Each interval is then approximated using a cubic equation, step 5. The use of a cubic equation has the advantage that smooth transitions are made possible near the intersection of two adjacent intervals. Discontinuity between adjacent intervals is avoiding by ensuring that the first order derivative is equal.

Preferably, the cubic equation is:

$$C_1(\overline{N} \cdot \overline{H})^3 + C_2(\overline{N} \cdot \overline{H})^2 + C_3(\overline{N} \cdot \overline{H}) + C_4$$

For each of the control points at either end of the interval in question, the coefficients $C_1$, $C_2$, $C_3$ and $C_4$ of the cubic equation are derived, step 7, using the following matrix:

$$\begin{bmatrix} C_1 \\ C_2 \\ C_3 \\ C_4 \end{bmatrix} = \begin{bmatrix} x_0^3 & x_0^2 & x_0 & 1 \\ x_1^3 & x_1^2 & x_1 & 1 \\ 3x_0^2 & 2x_0 & 1 & 0 \\ 3x_1^2 & 2x_1 & 1 & 0 \end{bmatrix}^{-1} \begin{bmatrix} P_1 \\ P_4 \\ R_1 \\ R_4 \end{bmatrix}$$

where $x_0$ and $x_1$ are the values of $\overline{N} \cdot \overline{H}$ for the interval endpoints; $P_1$ and $P_4$ are the values of Beckmann$_{mod}$ at the endpoints and $R_1$ and $R_4$ are the values of the first order derivative at the interval endpoints (tangent to the function at $x_0$ and $x_1$).

The coefficients are then scaled by a factor of $2^f$, step 9, to bring them into the range −1 to 1. The value of "f" is chosen to be common to all control points. Therefore the max(abs(control point)) value is chosen, and f is then based on that value. The factoring of the coefficients in this manner allows the coefficients to be represented using 1.15 fixed point numbers, thereby avoiding the use of floating point calculations, which in turn provides a large saving on computation power (i.e. number of instructions required to compute the values).

A more detailed explanation will now be given regarding how the above mentioned matrix is derived.

The distribution function being approximated, for example the Beckmann distribution function, is relatively well behaved function in so far as its curve follows a relatively smooth path. As such, a piecewise approximation to the curve can give good results. The cubic piecewise approximation used in the present invention gives particularly good results, since it takes into account not only a series of control points, but also the tangent vectors at these points (i.e. the gradient of the curve, being the function's first order derivative).

Thus, the approximation technique calculates the first order derivative of the Beckmann function. Since the standard and first order derivatives of the function are being used in the interpolation of the curve, a Hermite curve can be used to carry out the approximation.

The following describes how the curve can be approximated in this way, using n control points.

$$beckmann(\beta, m) := \frac{e^{-\left(\frac{\tan(\beta)}{m}\right)^2}}{(4m^2 \cos(\beta))}$$

$$dbeckmann(\beta, m) := -\left[2 \cdot \frac{[1 + (\tan(\beta))^2]}{m^2 \cos(\beta)} + 1\right] \cdot e^{-\left(\frac{\tan(\beta)}{m}\right)^2} \cdot \frac{(\tan\beta)}{4m^2}$$

-continued $$n := 8 \quad u := \frac{\pi}{2} \quad m := 0.2$$
$$t := 0, 0.1 \ldots n \quad M := 4$$
$$int(x) := x - mod(x, 1)$$
$$low(x) := int(x) \cdot \frac{u}{n} \quad hi(x) := \left(int(x) + 1 \cdot \frac{u}{n}\right)$$
$$P1(x) := beckmann(low(x), m) \quad P4(x) := beckmann(hi(x), m)$$
$$R1(x) := \frac{debeckmann(low(x), m)}{M} \quad R4(x) := \frac{dbeckmann(hi(x), m)}{M}$$

$$Q(u, p1, p4, r1, r4) := (2u^3 - 3u^2 + 1)p1 + (-2u^3 + 3u^2)p4 +$$
$$(u^3 - 2u^2 + u)r1 + (u^3 - u^2)r4$$
$$hermy(u) := Q(u - int(u), P1(u), P4(u), R1(u), R4(u))$$
$$hermx(u) := Q\left(u - int(u), low(u), hi(u), \frac{1}{M}, \frac{1}{M}\right)$$

The Hermite curves are parametric curves defined in t. Thus, when plotting the Beckmann curve as an approximation using Hermite curves, it is necessary to plot two functions on the axes of the graph. In the example described above, it is necessary to plot hermy(t) against hermx(t). This has the advantage that for a given x there can be multiple values of y. In essence, this means that loops can be created in the curve. For well behaved curves, this is unnecessary since the curve should not contain loops. For well behaved curves, the function defining x should be very close to a multiple of t. However, in the case of the Beckmann function, the curve is not well behaved when replacing kt for hermx(t). It is approximately the same curve, but is not as smooth. This results in mach bands appearing on the eventual image. In order to make the curve appear smooth, it is necessary to use a different class of curve, which is defined around x directly instead of t. This is explained more fully in the following set of equations.

The hermite curve is defined as the following cubic equation defined using parametric term t.

$$Q(t)=C1t^3+C2t^2+C3t+C4 \text{ where } 0.0 \leq t \leq 1.0$$

There are defined a set of coefficients ($C_1$, $C_2$, $C_3$ and $C_4$) defined for each interval. The endpoints of the interval are defined as the control points of the curve.

Furthermore, we can define the function as follows $$x(t)=C1_xt^3+C2_xt^2+C3_xt+C4_x$$

Where $C_{1x}$, $C_{2x}$, $C_{3x}$, $C_{4x}$ are the x components of the coefficients.

By differentiating the equation shown above, and substituting values for t at t=0 and t=1 (where the known control points exist), it is possible to create a matrix, representing the equations for the control points, and their derivatives such that $$\begin{bmatrix} P_1 \\ P_4 \\ R_1 \\ R_4 \end{bmatrix} = G_{Hx} \begin{bmatrix} 0 & 0 & 0 & 1 \\ 1 & 1 & 1 & 1 \\ 0 & 0 & 1 & 1 \\ 3 & 2 & 1 & 0 \end{bmatrix} \cdot M_H \cdot G_{Hx}$$

where the rows of the 4×4 matrix are simply Q(t) with t=0 and t=1 substituted (rows 0 and 1), and Q'(t) with t=0 and t=1 substituted (rows 2 and 3). $M_H$ is the matrix which is used to multiply the control points to give the coefficients. $P_1$, $P_4$, $R_1$ and $R_4$ are the control points at t=0 and t=1 and the tangent vectors to the curve at t=0 and t=1 (derived in this case by differentiating the Beckmann function and substituting in the relevant values).

Thus we can derive a value for $M_H$ as follows $$M_H = \begin{bmatrix} 0 & 0 & 0 & 1 \\ 1 & 1 & 1 & 1 \\ 0 & 0 & 1 & 1 \\ 3 & 2 & 1 & 0 \end{bmatrix}^{-1} = \begin{bmatrix} 2 & -2 & 1 & 1 \\ -3 & 3 & -2 & 1 \\ 0 & 0 & 1 & 0 \\ 1 & 0 & 0 & 0 \end{bmatrix}$$

which allows us to define the parametric form of the Hermite curve in terms of the control points as follows $$Q(t)+(2t^3-3t^2+1)P_1+(-2t^3+3t^2)P_4+(t^3-2t^2+t)R_1+(t^3-t^2)R_4$$

It is clear from this curve that for values of t=0, the value of Q (t) is $P_1$ which is exactly what one would expect.

As indicated earlier, this form of the curve requires the function to be evaluated for both x and y. Using an approximation of x based on multiples of t is a reasonable approximation, but does mean that mach bands appear where the curve is not as smooth as the fully derived case. In order to combat this, the curve is redefined to be derived as follows.

$$Q(x)=C1x^3+C2x^2+C3x+C4$$

This allows a smooth curve to be defined for the function for a given x. This introduces several problems. Since the interval between control points is no longer defined over 0 to 1, a standard matrix to derive the coefficients cannot be used. Since the curve is defined over x, it is not possible to have multiple values of y for a given x. This is not a problem for well behaved curves, but may pose a problem for curves that are not well behaved, since the curve will be undefined.

In order to define the new function, it is necessary to reformulate the matrix and its inverse. Using the same values as control points on the curve as before, i.e $P_1$ and $P_4$ (points on the curve) and $R_1$ and $R_4$ (tangents to the curve at the control points), the coefficient definition can be reformulated as follows.

$$\begin{bmatrix} C_1 \\ C_2 \\ C_3 \\ C_4 \end{bmatrix} = \begin{bmatrix} x_0^3 & x_0^2 & x_o & 1 \\ x_1^3 & x_1^2 & x_1 & 1 \\ 3x_o^2 & 2x_0 & 1 & 0 \\ 3x_1^2 & 2x_1 & 1 & 0 \end{bmatrix}^{-1} \begin{bmatrix} P_1 \\ P_4 \\ R_1 \\ R_4 \end{bmatrix}$$

where $x_0$ and $x_1$ are the x coordinates at the endpoints of the interval.

Thus, the matrix must be created and inverted for each curve interval, which gives the four coefficients for the cubic curve equation.

This produces a well behaved curve which is defined for x.

The above mentioned approximation provides a very close match to the true Beckmann distribution function, but requires far less computation. In addition, by factoring the results by a factor of $2^f$, the coefficients can be normalised to a range −1.0 to 1.0, thereby avoiding the need for floating point calculations. Instead, the final result can be achieved by shifting the result by the power of the factor value, f. This shift technique, which can either be a shift-left or a shift-right requires minimal computational work.

Each modified Beckmann distribution function, Beckmann$_{mod}$, can be represented by a 56 byte look-up table. This table can either be embedded in the material for an object, or can be calculated when a material is loaded into the context for a scene, i.e. calculated on the fly.

For this purpose, each processor element in the SIMD array must be able to access a memory location using an offset unique to that element. This enables the array to access look-up tables in parallel across the array.

Once the coefficients have been extracted from the look up table, the cubic equation is multiplied out, for example, by expressing as 3 multiplies and 3 additions. This is a significant saving over the original Beckmann Distribution Function calculation.

The approximation technique mentioned above can be applied to distribution functions other than the Beckmann function. In addition to other microfacet distribution functions such as the Gaussian and Trowbridge-Reitz distribution functions, the approximation technique could also be used to simplify the calculation of the Fresnel term.

A piecewise cubic approximation is formed for the Fresnel curve for given wavelengths, and a suitable look-up table created in the material, in a similar manner to that already described above in relation to the Beckmann function.

Alternatively, when calculating the Cook-Torrance model, the Fresnel term could be approximated using other techniques. For example, Cook and Torrance use an approximation for each of the Red, Green and Blue components. According to another example, the calculation of Cook-Torrance model could use a simpler approximation for the Fresnel term, which assumes that the viewpoint and light source are at infinity. This simplifies matters in that the equation need only be calculated once per frame, as it will be the same at all points in the scene. However, this has a disadvantage is that inaccuracies can become apparent as the light and/or viewer move close to a surface.

Figure 3:
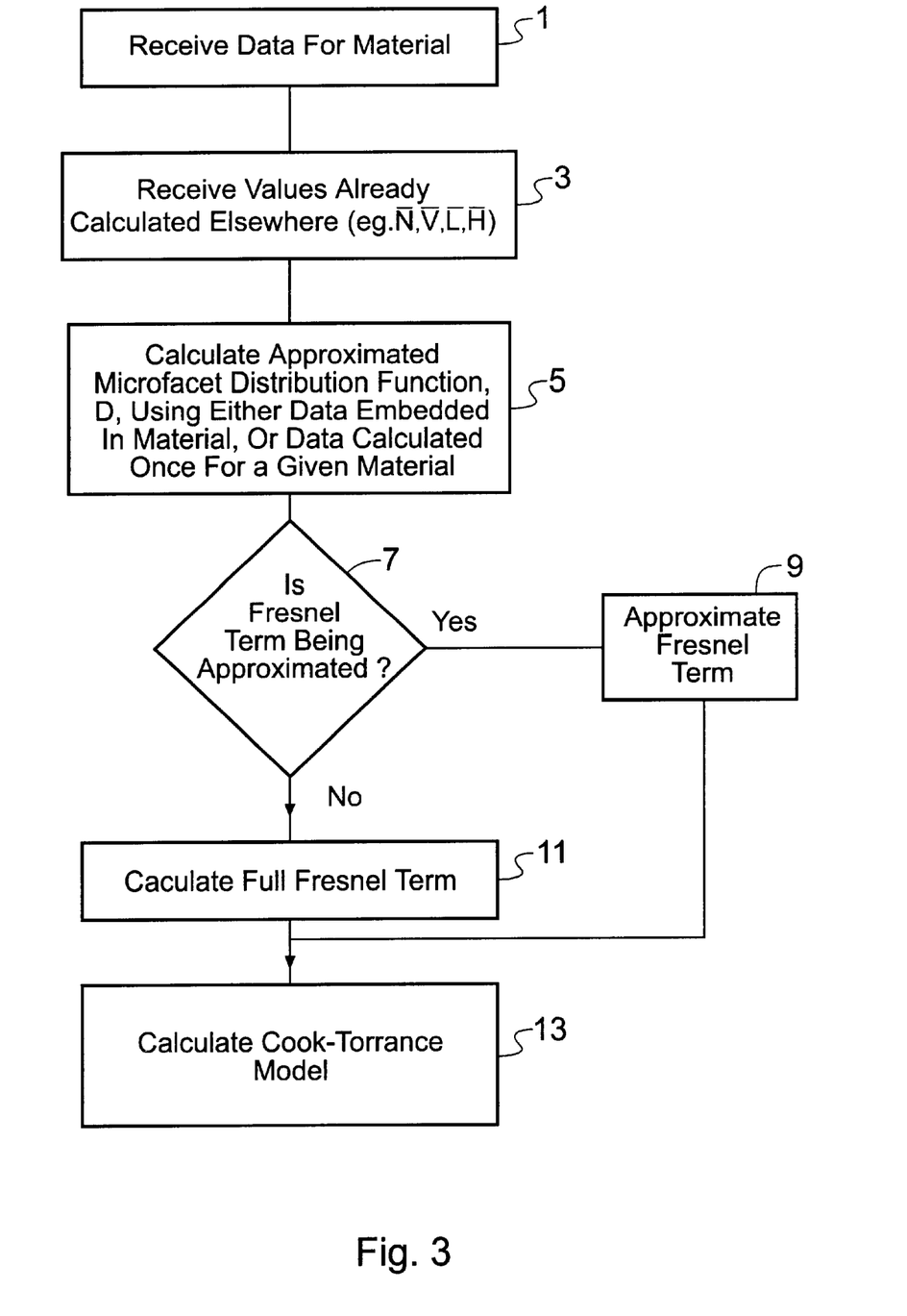
FIG. 3 shows how the approximation technique of FIG. 2 can be used in Cook-Torrance shading.

Referring to FIG. 3, the Cook-Torrance model calculates the shading based on the approximations of the Beckmann function and/or Fresnel term mentioned above.

The SIMD architecture receives data relating to the material which is being modelled, step 1. During the lighting stage in the graphics pipeline, at each pixel, various other values in the Cook-Torrance equation will have been calculated. Thus, most of the terms may have already been calculated in other parts of the lighting calculation, and are therefore already available for the Cook-Torrance model, step 3. These include, for example, the surface normal N, the viewpoint vector V, the light vector L, and H, the halfway vector between V and L. The value of m (i.e. the root mean square slope of microfacets) will be embedded in the material, and will be constant for a given material.

The Beckmann$_{mod}$ data may either be available in the form of a look-up table embedded in the material, or, if not, is calculated once per material. Once calculated, the Beckmann$_{mod}$ data is then available for subsequent data processing, and used to approximate the microfacet distribution function, step 5.

If an approximation of the Fresnel term is also being used, then this approximation is derived, steps 7, 9. Otherwise, the full Fresnel tern is calculated, step 11.

The Cook-Torrance model is then calculated, step 13, using the approximation(s) previously calculated.

It is noted that although the preferred embodiment refers to using the Beckmann Distribution Function, the invention is equally applicable to any other microfacet distribution function. Likewise, although the preferred approximation of the Fresnel term uses a piecewise cubic approximation similar to the Beckmann distribution function, other approximations of the Fresnel term may also be used. Furthermore, the Fresnel term may be approximated using an array wide value which has already been calculated.

Also, although the preferred embodiment uses a cubic approximation, other polynomials may be used, such a linear, quadratic, quintic, and so on.

The approximation methods described above enable the Cook-Torrance model to be computed quicker, thereby allowing real-time physically-based shading to be performed. The method of data processing is particularly suited for use in a SIMD environment.

Figure 4:
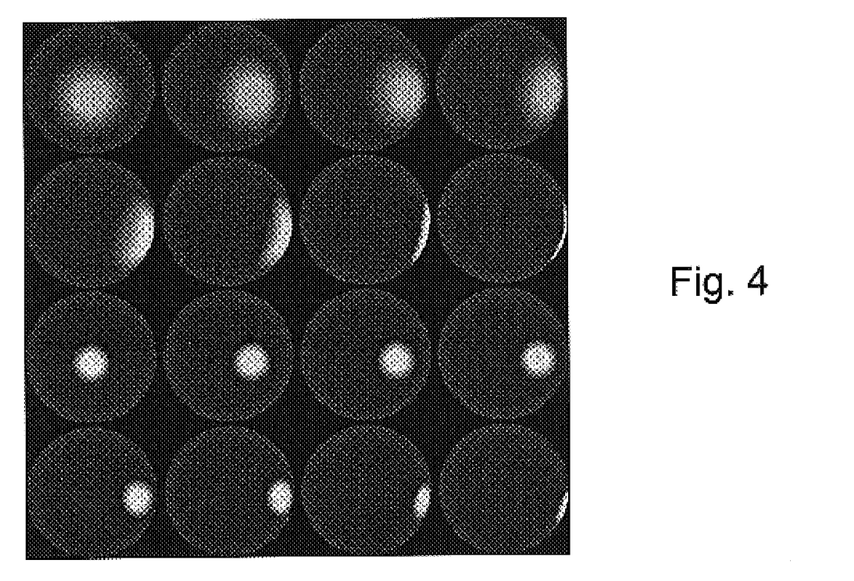
FIG. 4 shows Cook-Torrance shading having full Beckmann Distribution Function, and using the full Fresnel term, according to the prior art.
Figure 5:
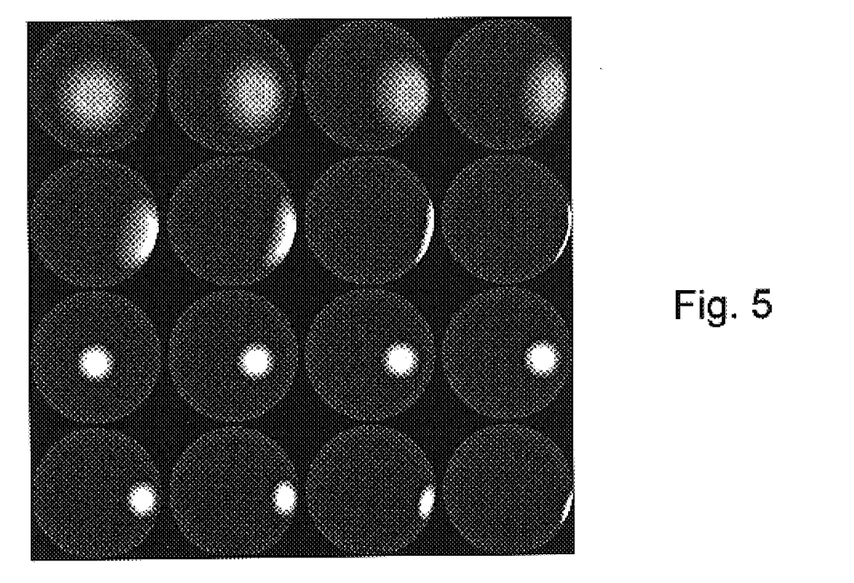
FIG. 5 shows Cook-Torrance shading having approximated Beckmann Distribution Function according to the present invention, plus an approximated Fresnel term.

FIG. 4 illustrates a set of spheres rendered using a Cook-Torrance model using the full Beckmann distribution function and full Fresnel term, i.e. no approximation. The top eight spheres use m=0.2, while the bottom eight spheres use m=0.6. FIG. 5 shows the spheres rendered using a Cook-Torrance shading using the piecewise cubic approximation of the present invention, again having the top eight spheres using m=0.2 and the bottom eight spheres using m=0.6, but where the Fresnel term was approximated using infinite light source and viewpoint. This approximation of the Fresnel term accounts for the slight differences in the results. The light source and viewpoint in these images were quite close to the surface of the sphere in order to accentuate any problems this approximation would cause. In most cases, the light source and viewpoint would be much further from the object and thus cause less marked differences. However, even in this extreme case, the difference is not significant. Without any comparison with the correct result an observer would not notice the small error.

Using the approximations described above, the Cook-Torrance model can be implemented on a SIMD architecture in approximately 1000 cycles. If, for example, the architecture uses 1536 processors running at 200 MHZ, this translates to 307 Mpixels/s. This compares very favourably with a similar architecture implementing Phong shading, which also takes approximately 1000 cycles.

If we take into account the fact that the hardware must also perform all geometry calculation, texturing, diffuse lighting calculations and other features in the rendering pipeline for OpenGL, it is evident that the Phong and Cook-Torrance terms are a minor part of the overall time taken per frame. This reduces the effective cost of the Cook-Torrance shading relative to the conventional Phong shading.

What is claimed is:

1. A method of determining shading values in a graphics processing system using an approximation of a Beckmann Distribution Function (BDF), the BDF being defined as:

$$D = \frac{1}{4m^2\cos^4\beta}e^{-\left(\frac{\tan\beta}{m}\right)^2}$$

where,
m=Root mean square slope of microfacets
β=Angle between $\overline{N}$ and $\overline{H}$
the method comprising the steps of:
(a) reformulating the BDF in terms of the scalar product of the surface normal $\overline{N}$ and the viewpoint-light half-vector $\overline{H}$ ($\overline{N}\cdot\overline{H}$) to produce a modified BDF;
(b) dividing a portion of the BDF into a plurality of intervals, n, each interval defined by first and second control points at its boundaries; and,
(c) approximating each interval using a cubic approximation to produce coefficients for use in determining the shading values.

2. A method as claimed in claim 1, wherein the coefficients are scaled by a factor of $2^f$.

3. A method as claimed in claim 2, whereby f is equal for all intervals.

4. A method as claimed in claim 1, wherein the modified Beckmann distribution function is defined as:

$$D = \frac{1}{4(m^2(\overline{N}\cdot\overline{H}))^4} e^{-\left(\frac{\tan\arccos\beta}{m}\right)^2}.$$

5. A method as claimed in claim 1, wherein the step of approximating each interval using a cubic approximation uses the following matrix to determine the coefficients of the cubic equation:

$$\begin{bmatrix} C_1 \\ C_2 \\ C_3 \\ C_4 \end{bmatrix} = \begin{bmatrix} x_0^3 & x_0^2 & x_0 & 1 \\ x_1^3 & x_1^2 & x_1 & 1 \\ 3x_0^2 & 2x_0 & 1 & 0 \\ 3x_1^2 & 2x_1 & 1 & 0 \end{bmatrix}^{-1} \begin{bmatrix} P_1 \\ P_4 \\ R_1 \\ R_4 \end{bmatrix}$$

where,

P=value of BDF at the end points of the interval, and

R=value of $1^{st}$ order derivatives at the end points of the interval.

6. A method as claimed in claim 1, wherein the portion of the BDF relates to a portion in which the data changes significantly.

7. A method as claimed in claim 1, wherein the modified BDF data is calculated once for a given material.

8. A method as claimed in claim 1, wherein the modified BDF data is predetermined for a given material.

9. A method as claimed in claim 1, wherein the cubic equation is:

$$C_1(\overline{N}\cdot\overline{H})^3 + C_2(\overline{N}\cdot\overline{H})^2 + C_3(\overline{N}\cdot\overline{H}) + C_4.$$

10. A method as claimed in claim 1, wherein n=8.

11. A method of determining shading values in a graphics processing system using a Cook-Torrance model, the Cook-Torrance model being:

$$\rho_s = \frac{F_\lambda}{\pi} \frac{DG}{(\overline{N}\cdot\overline{V})(\overline{N}\cdot\overline{L})}$$

where, $F_\lambda$=Fresnel term, relating incident light to reflected light;

D=Distribution function for microfacets;

G=Geometrical attenuation factor, the masking and shadowing effects of the microfacets on each other;

$\overline{N}$=Surface normal;

$\overline{V}$=Viewpoint vector;

$\overline{L}$=Light vector;

the method comprising:

receiving data for a material being modelled;

approximating the microfacet distribution function D using a piecewise cubic interpolation of the distribution function; and, calculating the Cook-Torrance model using the approximation of the microfacet distribution function.

12. A method as claimed in claim 11, wherein the step of approximating the microfacet distribution function comprises the steps of:

determining whether a look-up table exists for the set of coefficients for approximating the BDF using cubic interpolation, and, if so, extracting the appropriate data, and, if not, calculating the data by:

dividing the function into a plurality of intervals, n;

approximating each interval using a cubic approximation;

for each control point at the end of an interval, deriving the coefficients of the cubic equation;

scaling the coefficients by a factor of $2^f$; and, multiplying out the cubic equation to obtain the microfacet distribution values.

13. A method of determining shading values in a graphics processing system using an approximation of a microfacet distribution function, the method comprising:

(a) dividing a portion of the microfacet distribution function into one or more intervals, n, each interval defined by first and second control points at its boundaries; and, (b) approximating each interval using a polynomial approximation to produce coefficients for use in determining the shading values.

14. A method as claimed in claim 13, wherein the polynomial approximation is a linear approximation.

15. A method as claimed in claim 13, wherein the polynomial approximation is a quadratic approximation.

16. A method as claimed in claim 13, wherein the polynomial approximation is a cubic approximation.

17. A method as claimed in claim 13, wherein the coefficients are scaled by a factor of $2^f$.

18. A method as claimed in claim 17, wherein f is equal for all intervals.

19. A method as claimed in claim 13, wherein the portion of the microfacet distribution function relates to a portion in which the data changes significantly.

20. A method as claimed in claim 13, wherein n=8.

21. A method as claimed in claim 13, wherein the shading values are determined in real time.

22. A graphics processing system having means for determining shading values using an approximation of a Beckmann Distribution Function (BDF), the BDF being defined as:

$$D = \frac{1}{4m^2\cos^4\beta} e^{-\left(\frac{\tan\beta}{m}\right)^2}$$

where, m=Root mean square slope of microfacets;

$\beta$=Angle between $\overline{N}$ and $\overline{H}$;

the graphics processing system comprising:

(a) reformulating means for reformulating the BDF in terms of the scalar product of the surface normal and the viewpoint-light half-vector ($\overline{N}\cdot\overline{H}$) to produce a modified BDF;

(b) dividing means for dividing a portion of the BDF into a plurality of intervals, n, each interval defined by first and second control points at its boundaries; and, (c) approximating means for approximating each interval using a cubic approximation to produce coefficients for use in determining the shading values.

23. A graphics processing system as claimed in claim 22, further comprising factoring means for scaling the coefficients by a factor of $2^f$.

24. A graphics processing system as claimed in claim 23, whereby f is equal for all intervals.

25. A graphics processing system as claimed in claim 22, wherein the modified Beckmann distribution function is defined as:

$$D = \frac{1}{4(m^2(\overline{N}\cdot\overline{H}))^4} e^{-\left(\frac{\tan\arccos\beta}{m}\right)^2}.$$

26. A graphics processing system as claimed in claim 22, wherein the approximating means comprises the following matrix to determine the coefficients of the cubic equation:

$$\begin{bmatrix} C_1 \\ C_2 \\ C_3 \\ C_4 \end{bmatrix} = \begin{bmatrix} x_0^3 & x_0^2 & x_0 & 1 \\ x_1^3 & x_1^2 & x_1 & 1 \\ 3x_0^2 & 2x_0 & 1 & 0 \\ 3x_1^2 & 2x_1 & 1 & 0 \end{bmatrix}^{-1} \begin{bmatrix} P_1 \\ P_4 \\ R_1 \\ R_4 \end{bmatrix}$$

where,
P=value of BDF at the end points of the interval, and
R=value of $1^{st}$ order derivatives at the end points of the interval.

27. A graphics processing system as claimed in claim 22, wherein the dividing means divides a portion of the BDF in which the data changes significantly.

28. A graphics processing system as claimed in claim 22, wherein the reformulating means calculates the modified BDF data once for a given material.

29. A graphics processing system as claimed in claim 22, wherein the modified BDF data is predetermined for a given material.

30. A graphics processing system as claimed in claim 22, wherein the approximating means uses the following cubic equation:

$$C_1(\overline{N}\cdot\overline{H})^3 + C_2(\overline{N}\cdot\overline{H})^2 + C_3(\overline{N}\cdot\overline{H}) + C_4.$$

31. A graphics processing system as claimed in claim 22, wherein n=8.

32. A graphics processing system for determining shading values using a Cook-Torrance model, the Cook Torrance model being:

$$\rho_s = \frac{F_\lambda}{\pi} \frac{DG}{(\overline{N}\cdot\overline{V})(\overline{N}\cdot\overline{L})}$$

where,
$F_\lambda$=Fresnel term, relating incident light to reflected light;
D=Distribution function for microfacets;
G=Geometrical attenuation factor, the masking and shadowing effects of the microfacets on each other;
$\overline{N}$=Surface normal;
$\overline{V}$=Viewpoint vector;
$\overline{L}$=Light vector;
the graphics processing system comprising:
receiving means for receiving data for a material being modelled;
approximating means for approximating the microfacet distribution function D using piecewise cubic interpolation of the distribution function; and,
calculating means for calculating the Cook-Torrance model using the approximation of the microfacet distribution function.

33. A graphics processing system as claimed in claim 32, wherein the approximating means comprises:
means for determining whether a look-up table exists for the set of coefficients for approximating the microfacet distribution function using cubic interpolation, and, if so, extracting the appropriate data, and, if not, calculating the data by:
dividing the function into a plurality of intervals, n;
approximating each interval using a cubic approximation;
for each control point at the end of an interval, deriving the coefficients of the cubic equation;
scaling the coefficients by a factor of $2^f$; and, multiplying out the cubic equation to obtain the microfacet distribution value.

34. A graphics processing system having means for determining shading values using an approximation of a microfacet distribution function, the graphics processing system comprising:
(a) dividing means for dividing a portion of the microfacet distribution function into one or more intervals, n, each interval defined by first and second control points at its boundaries; and,
(b) approximating means for approximating each interval using a polynomial approximation to produce coefficients for use in determining the shading values.

35. A graphics processing system as claimed in claim 34, wherein the approximating means uses a linear approximation.

36. A graphics processing system as claimed in claim 34, wherein the approximating means uses a quadratic approximation.

37. A graphics processing system as claimed in claim 34, wherein the approximating means uses a cubic approximation.

38. A graphics processing system as claimed in claim 32, wherein the coefficients are scaled by a factor of $2^f$.

39. A graphics processing system as claimed in claim 38, wherein f is equal for all intervals.

40. A graphics processing system as claimed in claim 34, wherein the portion of the microfacet distribution function relates to a portion in which the data changes significantly.

41. A graphics processing system as claimed in claim 32, wherein n=8.

42. A graphics processing system as claimed in claim 34, wherein the coefficients are scaled by a factor of $2^f$.

43. A graphics processing system as claimed in claim 34, wherein n=8.

* * * * *